United States Patent [19]

White

[11] 4,115,965

[45] Sep. 26, 1978

[54] GUY STRAIN INSULATORS

[76] Inventor: Ira Thomas White, 318 Cherokee Dr., Trussville, Ala. 35173

[21] Appl. No.: 675,622

[22] Filed: Apr. 9, 1976

[51] Int. Cl.² .......................................... E04H 12/20
[52] U.S. Cl. .................................................. 52/148
[58] Field of Search .................... 52/148, 146, 98, 149

[56] References Cited

U.S. PATENT DOCUMENTS

| 1,084,695 | 1/1914 | Coghlin | 52/148 |
| 2,128,030 | 8/1938 | Koleno | 52/148 |
| 2,514,006 | 7/1950 | Morris | 52/148 |
| 3,049,194 | 8/1962 | Brendel | 52/148 |
| 3,245,649 | 4/1966 | Cassidy et al. | 52/148 |
| 3,504,460 | 4/1970 | Solberg | 52/148 |

*Primary Examiner*—Price C. Faw, Jr.

[57] ABSTRACT

A device to prevent application of destructive torsion forces to Guy Strain Insulators. This device completely eliminates the twisting effect applied to the fiberglass rod during tensioning of the stranded guy wire. The function of the device is such that as tension is increased, the fiber-glass rod is allowed to remain in its most favorable operating mode of straight tension only, with all torsion, torque or twisting forces removed.

2 Claims, 14 Drawing Figures

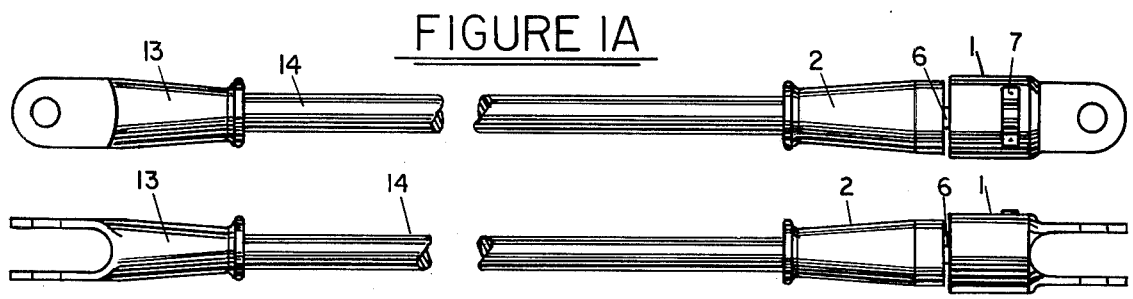
FIGURE 1A
FIGURE 1
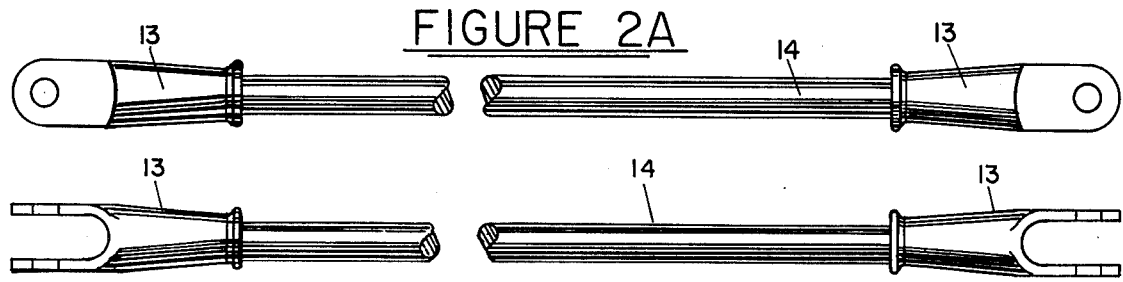
FIGURE 2A
FIGURE 2
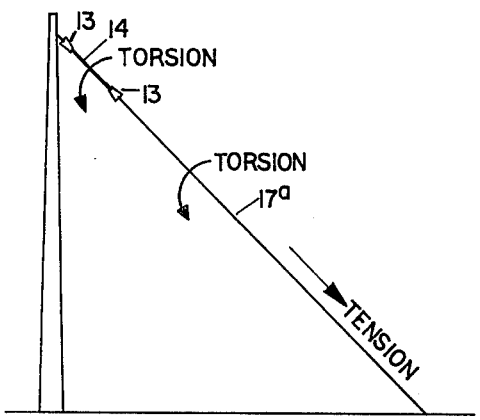
FIGURE 3
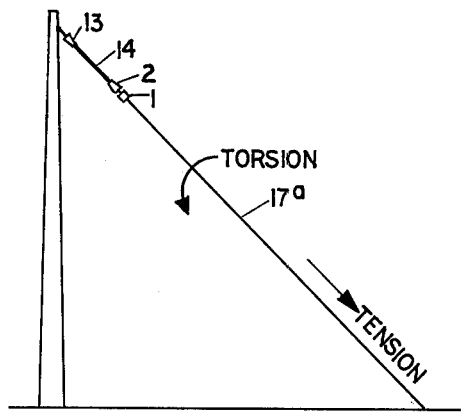
FIGURE 4

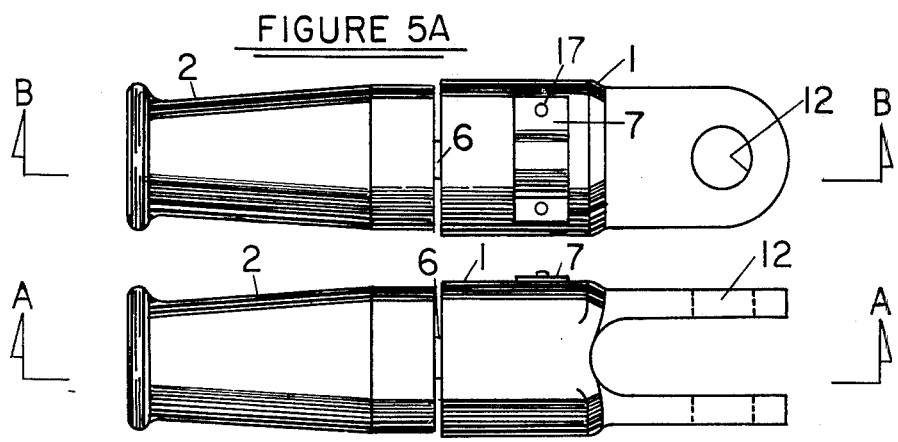
FIGURE 5A
FIGURE 5
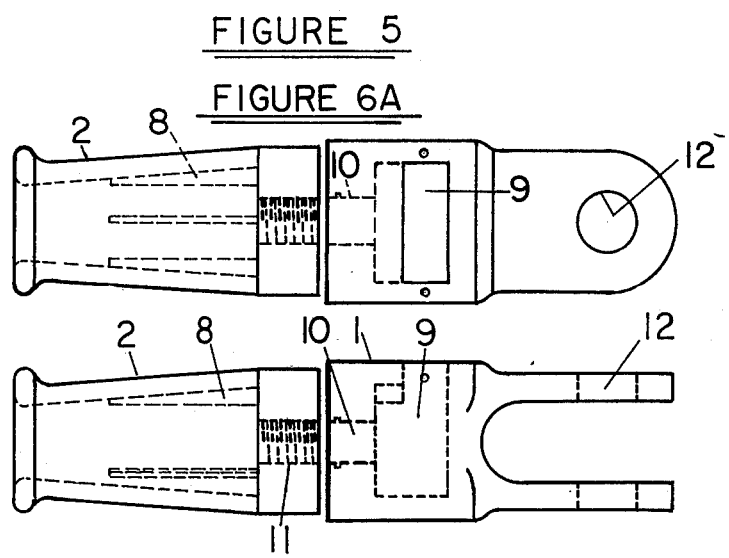
FIGURE 6A
FIGURE 6
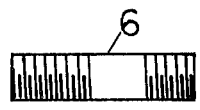
FIGURE 7
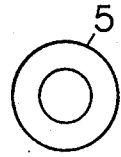
FIGURE 8
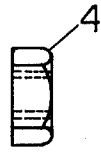
FIGURE 9
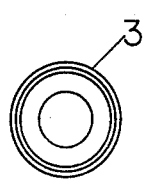
FIGURE 10
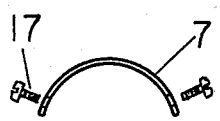
FIGURE 11
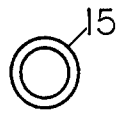
FIGURE 12

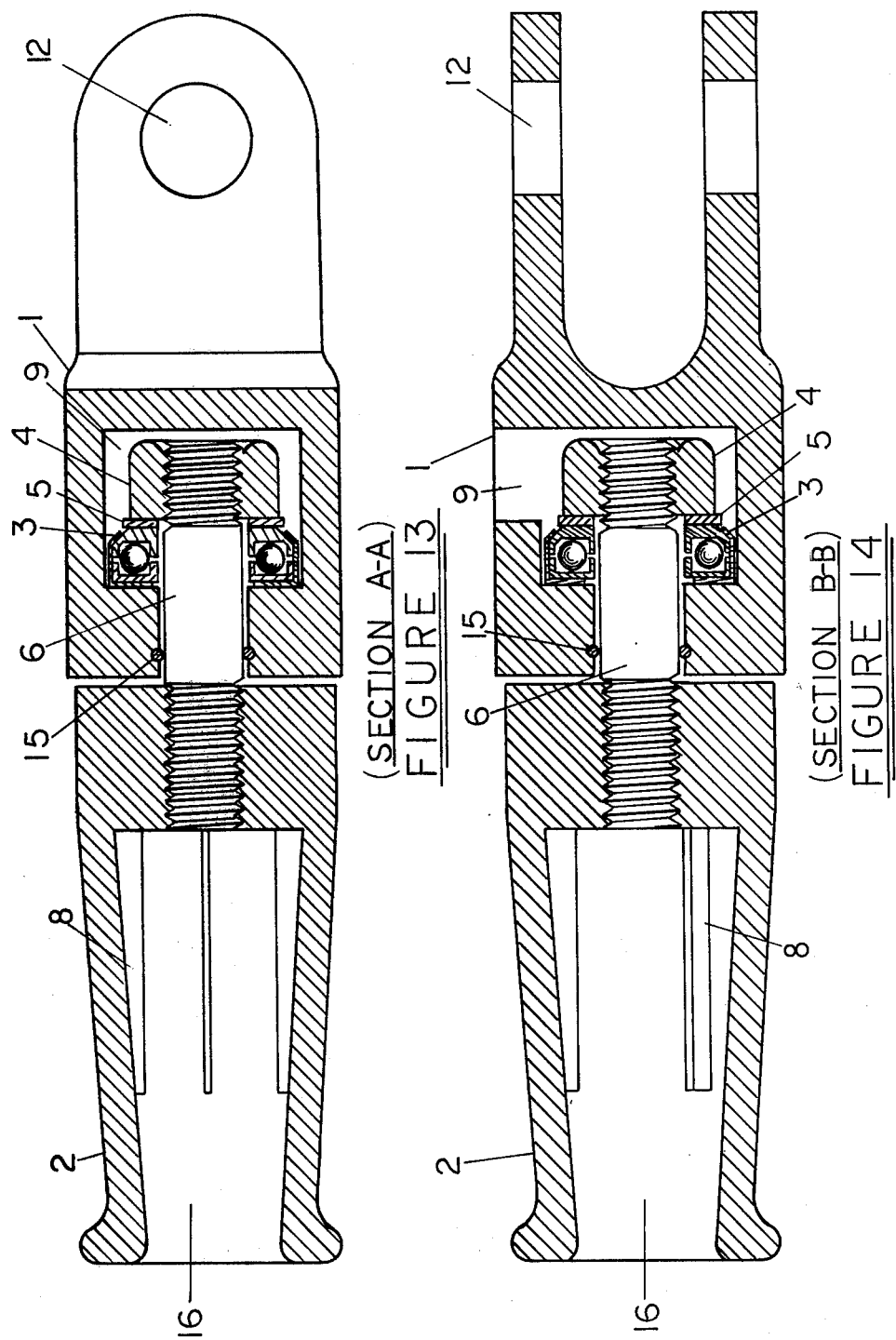

GUY STRAIN INSULATORS

The invention relates in general to an improved Guy Strain Insulator and more particularly an improved Guy Strain Insulator device which eliminates destructive torsion forces while at the same time performing the usual Guy Strain function in the present art of safety guying.

The invention will be described with respect to the safety guying of poles and towers used for support of electrical conductors on transmission and distribution lines but its use is not limited to this purpose.

In the process of installing high voltage transmission and distribution lines, it is necessary to support these lines or conductors at regular intervals with either poles or towers of varying heights and materials, depending on location, voltage rating and conductor size. In the present state of the art, to prevent leaning or falling of these pole or towers due to wind, ice on the conductors, directional changes of the high voltage line, and to allow more economical construction, it is customary to use a high strength guy wire which is secured to the pole or tower at an appropriate location and then secured to an anchor in the ground below at some distance from the base of the pole or tower so as to be diametrically opposite the greatest point of loading on the pole or tower. The guy wire is normally and usually secured on the pole or tower in close proximity to the energized conductors, and would, if it were not for a suitable insulating device, cause electrical power losses by electromagnetic induction into the guy wire. Also, it would be possible at extremely high line voltages, for the guy wire itself to become "charged" to an electrical potential that would be dangerous to persons who might touch the guy wire. The Guy Wire Insulator isolates and insulates the high voltage lines from the guy wire and ground.

The guy wire is obviously then, required to be tensioned or pulled tight enough to counteract the weight, tension, angle turns and dead end forces caused by stringing and sagging of the line conductors.

The Guy Strain Insulator is installed normally between the pole or tower and the guy wire and thus must be able to and is required to withstand the tensioning forces that maintain the poles or towers in their vertical and plumb position.

The high strength guy wire is composed of several strands of smaller wire wound and overlapped in a continuous twist or weave configuration known as a rope lay. During installation, as tension is applied, the guy wire rotates in the opposite direction of its original lay or twist and transmits this rotation or twist to the Guy Strain Insulator, this permanently twisting the fiberglass insulating rod with torsion forces which can cause immediate or delayed fracture of the fiberglass rod, and resulting in failure of poles or towers and the dropping of high voltage lines.

It is an object of the invention to provide an improved Guy Strain Insulator device that will permit or allow high value tensile loads to be applied to the fiberglass insulating rod and at the same time neutralize the torsion forces caused by the unwinding of the guy wire stranding during installation of the guy.

Another object of the invention is to provide an improved guy strain insulator device that will allow the fiberglass insulating rod to function only in its strongest mode, i.e. — tension, and thus greatly extend its predicted life, providing a safer, more reliable insulation.

A fuller understanding of the invention may be had by referring to the following description and claims taken together with the accompanying drawings in which:

FIG. 1 is plan view and FIG. 1A is a side view of the invention shown assembled to present state of the art components to more fully illustrate its function.

FIG. 2 is a plan view and FIG. 2A is a side view of a Guy Strain Insulator as used in the present state of the art of insulating guy wires from the electrical conductors.

FIG. 3 serves to graphically illustrate the location and application of torsion forces using the present state of the art Guy Strain Insulator.

FIG. 4 is a diagrammatic view which serves to graphically illustrate the location and application of torsion forces using the invention.

FIG. 5 is a plan view and FIG. 5A is a side view of the invention.

FIG. 6 is a plan view and FIG. 6A is a side view of the invention showing internal and external relationships.

FIGS. 7 thru 12 show other components employed in association with the invention.

FIG. 13 is a sectional view taken along section line A—A, FIG. 5 of the invention.

FIG. 14 is a sectional view taken along section line B—B, FIG. 5A of the invention with the cover plate 7 being omitted.

Referring to FIGS. 1, 1A, 5, 5A, 6, 6A, 13 and 14, the invention comprises a connector member or torsion fork 1 with mounting holes 12 and concentric internal cavities 9 and 10 with cavity 9 covered by a removable cover plate 7 secured by screws 17, and cavity 10 receiving a sealing ring 15, and connector member or torsion barrel 2 which has a tapered internal cavity 16 for receiving a typical fiberglass insulating rod 14, three equally spaced concentric rod insertion guides 8 and a threaded cavity 11 into which a threaded shaft 6 is screwed and staked. Bearing 3, washer 5, and nut 4 are inserted in cavity 9 of torsion fork 1 and threaded shaft 6 attached to torsion barrel 2 is inserted through torsion fork cavity 10, sealing ring 15, bearing 3, washer 5 and screwed into nut 4 to secure torsion fork 1 to torsion barrel 2. Cover plate 7 for cavity 9 is secured to torsion fork 1 with screws 17 to provide weatherproof operation in conjunction with sealing ring 15 in cavity 10.

In operation the guy strain insulator is oriented and installed typically to a pole or tower as illustrated graphically in FIG. 4, being affixed to and a part of fiberglass insulated rod 14 and clevis 13, clevis 13 being fixedly attached to said pole or tower and torsion fork 1 being fixedly attached thru mounting holes 12 to stranded guy wire 17a, said stranded guy wire 17a being highly tensioned with said tension causing stranded guy wire 17a to unwind from its normal rope lay configuration and applying torsion forces as illustrated in FIG. 4 by torsion arrow to torsion fork 1 which being free to turn on shaft 6, bearing 3, washer 5 and nut 4, allows fiberglass insulated rod 14 to remain in a straight torsion free position.

The invention has been described with a certain degree of particularity but it should be understood that the present disclosure has been made by way of example and that numerous change in details of construction and combination and arrangements of parts may be resorted to without departing from the spirit and scope of the invention.

What is claimed is:

1. A device for attaching one end of an elongated guy strain insulator to a stranded guy wire with the other end of said insulator being anchored comprising:
   (a) a first connector member carrying a clevis-like member adjacent one end thereof adapted to be attached to a stranded guy wire,
   (b) a second connector member having a barrel at one end thereof and an axially extending shaft carried by the other end thereof and rotatably connected to the other end of said first connector member with said first connector member being adapted to rotate freely under tension relative to said second connector member,
   (c) a sealed bearing unit carried by said first connector member and receiving said shaft,
   (d) retainer means carried by said shaft and limiting axial movement of said shaft relative to said bearing unit so that upon the application of tension and torsion forces to said guy wire said first connector member rotates freely on said bearing unit while said shaft remains stationary, and
   (e) means affixing said one end of said elongated guy strain insulator within said barrel of said second connector member with said insulator and said second connector member remaining stationary without any turning of said insulator about its longitudinal axis upon rotation of said first connector member under tension.

2. A device as defined in claim 1 in which annular sealing means is provided between said shaft and said first connector member to prevent the entrance of moisture and contaminates to said bearing unit.